United States Patent
Gilra

(10) Patent No.: US 8,315,479 B1
(45) Date of Patent: Nov. 20, 2012

(54) SLICING AND SCALING FIGURES

(75) Inventor: Anant Gilra, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 1057 days.

(21) Appl. No.: 12/037,930

(22) Filed: Feb. 26, 2008

(51) Int. Cl.
*G06K 9/32* (2006.01)

(52) U.S. Cl. .................... 382/298; 382/282; 382/283

(58) Field of Classification Search .......... 382/282–283, 382/298
See application file for complete search history.

(56) References Cited

U.S. PATENT DOCUMENTS

| | | | | |
|---|---|---|---|---|
| 4,790,028 A * | 12/1988 | Ramage | ...................... | 382/298 |
| 5,363,119 A * | 11/1994 | Snyder et al. | .................. | 345/668 |
| 5,400,051 A * | 3/1995 | Krueger, Jr. | .................. | 345/667 |
| 5,473,740 A * | 12/1995 | Kasson | .......................... | 345/628 |
| 5,579,459 A * | 11/1996 | Jennyc | .......................... | 345/627 |
| 5,809,182 A | 9/1998 | Ward et al. | | |
| 5,867,608 A | 2/1999 | Rice | | |
| 5,995,682 A | 11/1999 | Pawlicki et al. | | |
| 6,449,398 B1 * | 9/2002 | Gennetten | ...................... | 382/298 |
| 6,642,923 B1 * | 11/2003 | Stone et al. | .................... | 345/427 |
| 7,272,258 B2 * | 9/2007 | Berkner et al. | ............... | 382/176 |
| 7,941,001 B1 * | 5/2011 | Sahu et al. | .................... | 382/298 |
| 2001/0040585 A1 | 11/2001 | Hartford et al. | | |
| 2005/0276477 A1* | 12/2005 | Lin et al. | ........................ | 382/173 |
| 2006/0001650 A1* | 1/2006 | Robbins et al. | ............... | 345/173 |
| 2007/0076979 A1* | 4/2007 | Zhang et al. | .................. | 382/282 |
| 2007/0097261 A1* | 5/2007 | Smith et al. | .................... | 348/445 |

OTHER PUBLICATIONS

Adobe Real World Illustrator, "Understanding 9-Slice Scaling," Apr. 27, 2007, 2 pages pages.
"Adobe Illustrator C53," User Guide, 2007, 495 pages.

* cited by examiner

*Primary Examiner* — Jayesh A Patel
(74) *Attorney, Agent, or Firm* — Robert C. Kowert; Meyertons, Hood, Kivlin, Kowert & Goetzel, P.C.

(57) ABSTRACT

Slicing and scaling figures. An example method includes generating one or more slice lines for a figure. The one or more slice lines result in a plurality of regions including a central region and one or more corner regions for the figure. Further, the one or more corner regions are scaled while maintaining aspect ratio of the one or more corner regions.

22 Claims, 11 Drawing Sheets

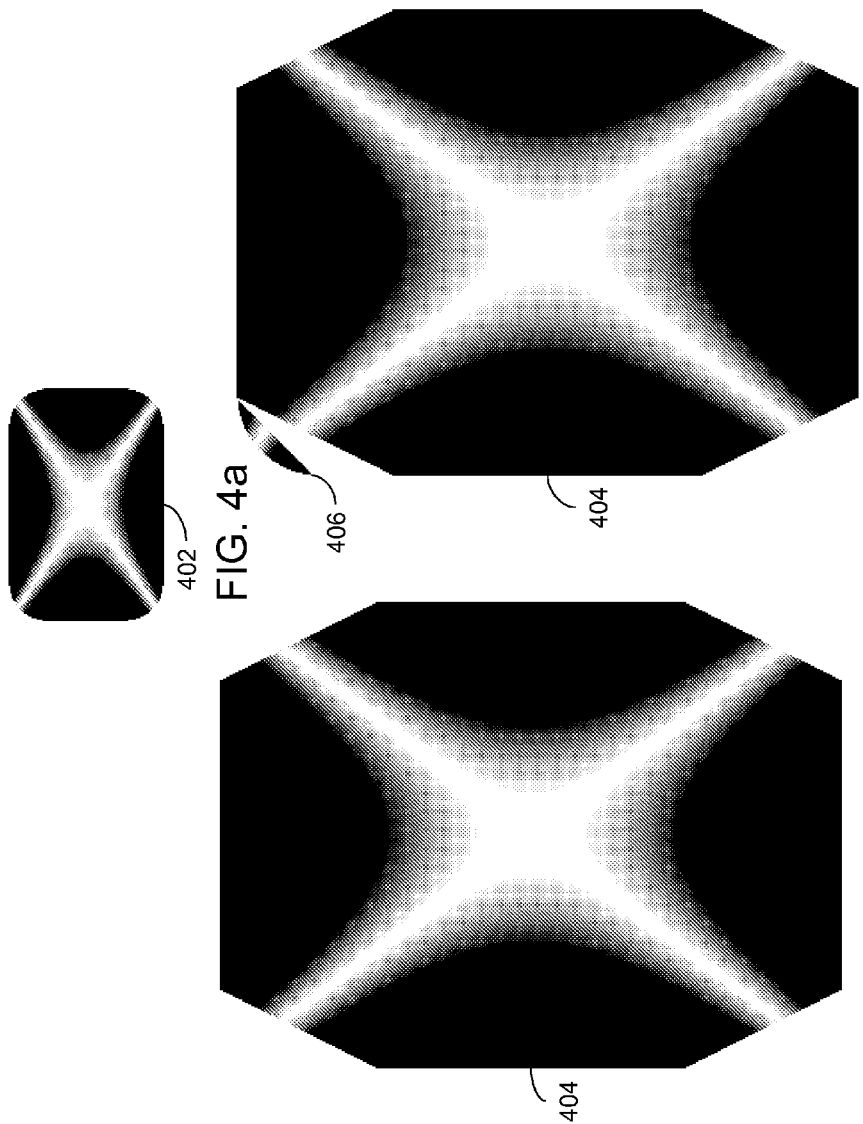

SLICING AND SCALING FIGURES

BACKGROUND

1. Technical Field

Embodiments of the invention relate generally to graphical application development environment, and more particularly to slicing and scaling of figures.

2. Discussion of Prior Art

Over a period of time use of graphical applications has increased tremendously. In graphical applications such as web designing, animation or movies it is often desired to change size of figures. Normal scaling of a figure results in an unpleasant graphical effect. The normal scaling of the figure leads to magnification of edges and corners which then become noticeably altered. For example, FIG. 1 illustrates a rectangle 102 with rounded corners and dimension (scale x=150, scale y=100). Rounded corners of rectangle 102, for example, rounded corner 112, have an aspect ratio of 1:1. The aspect ratio is width to height ratio. Rectangle 102 when scaled 2 times in the x direction and 4 times in the y direction normally, results in a jagged appearance as shown in a corner 108 of a normally scaled rectangle 104 of FIG. 1. Further, the aspect ratio of the rounded corners, for example, rounder corner 108, is also altered to 1:2 (2:4).

A developer uses various graphical tools to edit figures in graphical applications. One existing method that is used in web designing includes dividing the figure into nine sections by slicing it with a grid including two sets of perpendicular intersecting parallel lines. Specific ones of the nine sections are then scaled or transformed according to the grid in which they are located. This approach is referred to as "nine slice scaling", "nine scaling", "scale nine" or "slice nine". The nine slice scaling approach is applicable to both bitmap and vector figures.

In an example method of nine slice scaling, a middle section out of the nine sections is scaled normally. Top and bottom sections to the middle section are scaled in horizontal direction only. Left and right sections to the middle section are scaled in vertical direction only. Four corner sections out of the nine sections are never scaled. For example, rectangle 102 of FIG. 1 with rounded corners and dimension (scale x=150, scale y=100) when scaled 2 times in the x direction and 4 times in the y direction using the nine slice scaling, results in an odd appearance with unscaled rounded corners, for example, unscaled rounded corner 110 as shown in a nine slice scaled rectangle 106 of FIG. 1. Further, border pixels of the figure get affected and look very different. Moreover, in complex figures including many graphics the graphics also get distorted. For example, graphic 114 (shape "X") of rectangle 102 gets distorted to graphic 116. Also, nine slice scaling is not useful in case the figure is a rounded star or a rounded pentagon or of an irregular shape. In case the figure includes editable text, the text is also not scaled. Unscaled text also results in a less pleasant graphical effect. The graphical effect of unscaled text worsens, in cases where the figure is scaled unevenly, for example, when the difference between scale x and scale y is large.

Another existing technique that is used in web designing includes dividing the figure into three sections by slicing it with a grid including two parallel lines either in a horizontal direction or in a vertical direction. Specific ones of the three sections are then scaled or transformed according to the grid in which they are located. This approach is referred to as "three slice scaling", "three scaling", "scale three" or "slice three". The three slice scaling approach is applicable to both bitmap and vector figures. However, drawbacks of three slice scaling are similar to those encountered in nine slice scaling.

In light of the foregoing discussion there is a need for a method and system for an efficient scaling of figures.

SUMMARY

Embodiments of the invention described herein provide a method, system and machine-readable medium product for scaling figures.

An example method includes generating one or more slice lines for a figure. The one or more slice lines result in a plurality of regions including a central region and one or more corner regions for the figure. The central region is then scaled. Further, the one or more corner regions are scaled while maintaining aspect ratio of the one or more corner regions.

Another example method includes receiving one or more corner regions of a figure. Further, the one or more corner regions are scaled while maintaining aspect ratio of the one or more corner regions.

An example machine-readable medium product includes instructions operable to cause a programmable processor to perform generating one or more slice lines for a figure. The one or more slice lines result in a plurality of regions including a central region and one or more corner regions for the figure. The central region is then scaled. Further, the one or more corner regions are scaled while maintaining aspect ratio of the one or more corner regions.

An example system includes a generation module for generating one or more slice lines for a figure. The one or more slice lines result in a plurality of regions including a central region and one or more corner regions for the figure. Further, the system includes a scaling module for scaling the one or more corner regions while maintaining aspect ratio of the one or more corner regions.

BRIEF DESCRIPTION OF DRAWINGS

The illustrative examples in drawings are not necessarily drawn to scale.

FIGS. 4a, 4b, 4c, 4d, 4e and 4f are exemplary representations of N slice scaling of a rectangle with rounded corners in accordance with an embodiment of the invention;

DETAILED DESCRIPTION OF EMBODIMENTS

Figure 1:
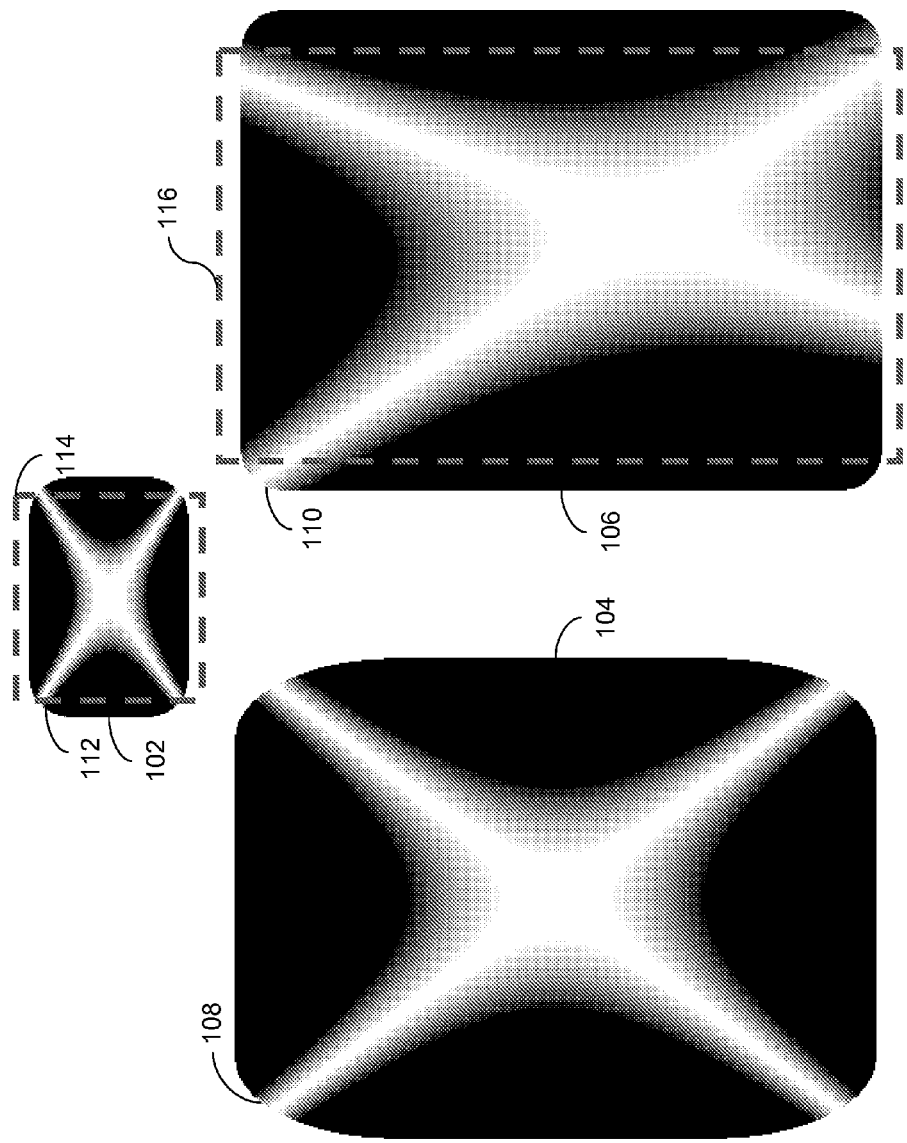
FIG. 1 is a representation of a figure scaled in accordance with prior art.
Figure 2:
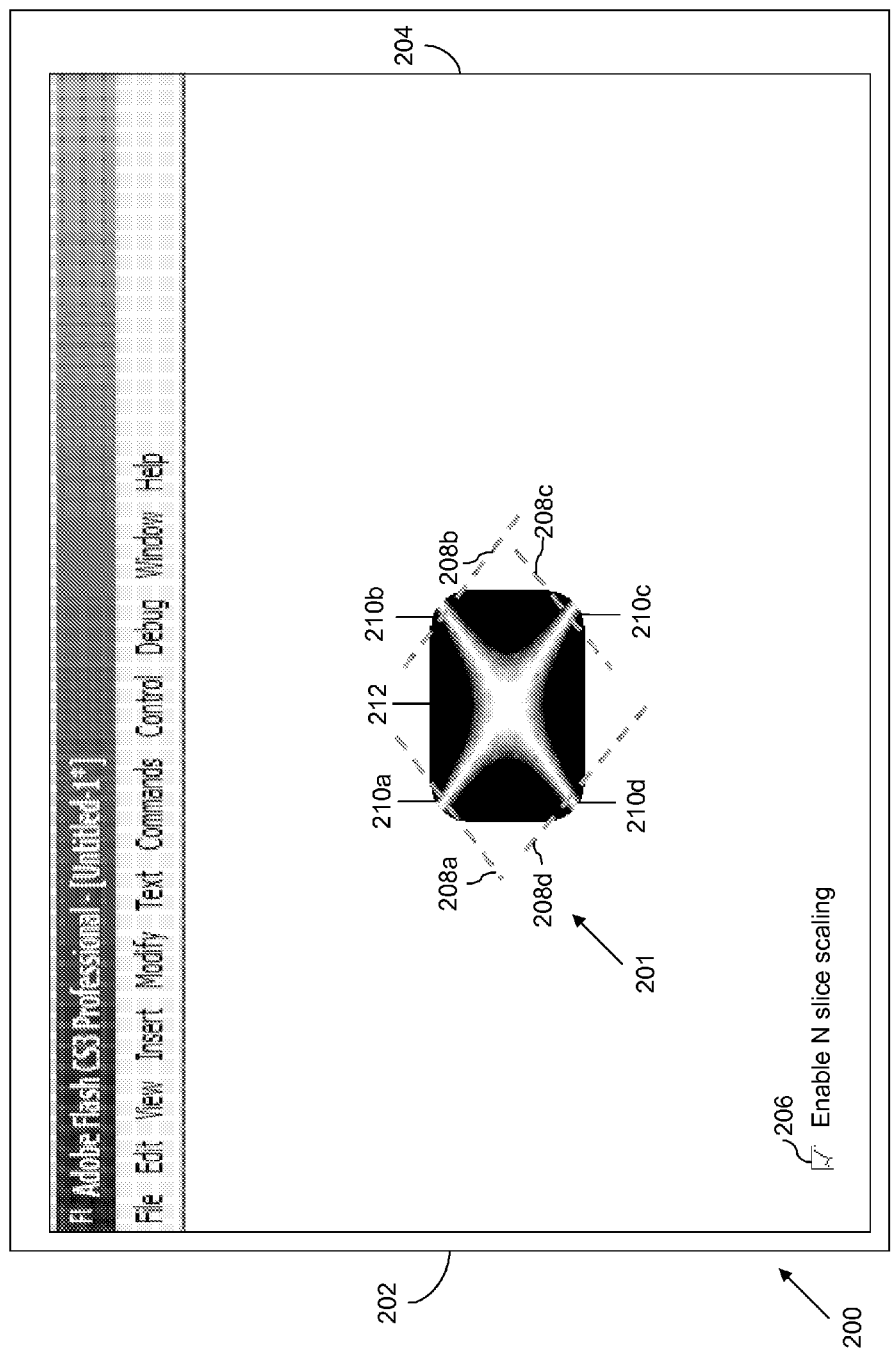
FIG. 2 is a block diagram of an environment in accordance with an embodiment of the invention.

FIG. 2 is a block diagram of an environment 200 in accordance with an embodiment of the invention. Environment 200 includes a system 202 with an exemplary application 204 running on system 202. System 202 may be a processing device. Examples of system 202 include but are not limited to computers, laptops, Personal Digital Assistants (PDAs) and mobile devices.

In an embodiment of the invention, application 204 is a web designing application, for example, Photoshop®, Illustrator® and Fireworks®. In another embodiment of the invention, application 204 is a desktop designing application, for example, Photoshop® and Illustrator®. In yet another embodiment of the invention, application 204 is a rich internet application, for example, Flex®. In still another embodiment of the invention, application 204 is a video application, for example, Flash®. In still another embodiment of the invention, application 204 is a graphical and imaging application, for example, Photoshop® and Illustrator®. All trademarks included herein are trademarks of Adobe Systems Incorporated, assignee of this application. Permission is hereby granted to reproduce these trademarks as part of reproducing a copy of this application or any patent issuing therefrom.

It will be appreciated that application 204 includes any application in which it is desirable to apply transformations to figures, for example, editing the figures, changing size of the figures, and scaling the figures.

In an embodiment of the invention, a figure is a combination of points or lines or planes or graphics or images or vectors or bitmaps forming a visible shape.

Some embodiments of the invention are applicable to figures with any shape or any size or having editable text. Further, some embodiments of the invention are applicable to both bitmap and vector figures.

It will be appreciated that the figures may be inserted or imported or drawn or copied or provided to application 204.

It will also be appreciated that a bitmap figure may be converted to a vector figure and then a method used for N slice scaling of the vector figure may be applied. It will also be appreciated that a vector figure may be converted to a bitmap figure and then a method used for N slice scaling of the bitmap figure may be applied.

In an embodiment of the invention, application 204 provides an option to a user to enable N slice scaling or multiple slice scaling, for example, by providing a check box 206.

In some embodiments of the invention, N slice scaling refers to slicing a figure into a plurality of regions by generating one or more slice lines and scaling one or more corner regions of the plurality of regions while maintaining aspect ratio of the one or more corner regions. For example, in N slice scaling of rectangle 201, rectangle 201 is divided into a plurality of regions by slice lines 208a, 208b, 208c and 208d.

In an embodiment of the invention, scaling includes increasing or decreasing size.

In an embodiment of the invention, the plurality of regions include the one or more corner regions and a central region. For example, in N slice scaling of rectangle 201, the plurality of regions include corner regions 210a, 210b, 210c and 210d, and a central region 212 bounded by the one or more slice lines.

In an embodiment of the invention, the central region may be identified by using the center of the figure. For example, central region 212 may be identified by using the center of rectangle 201. In another embodiment of the invention, a bigger region might be identified as the central region and smaller regions as the one or more corner regions.

The N slice scaling of the figure includes generating the one or more slice lines and scaling the one or more corner regions while maintaining the aspect ratio. Various methods for performing the N slice scaling are explained in detail in conjunction with FIG. 3 and FIG. 5.

Figure 3:
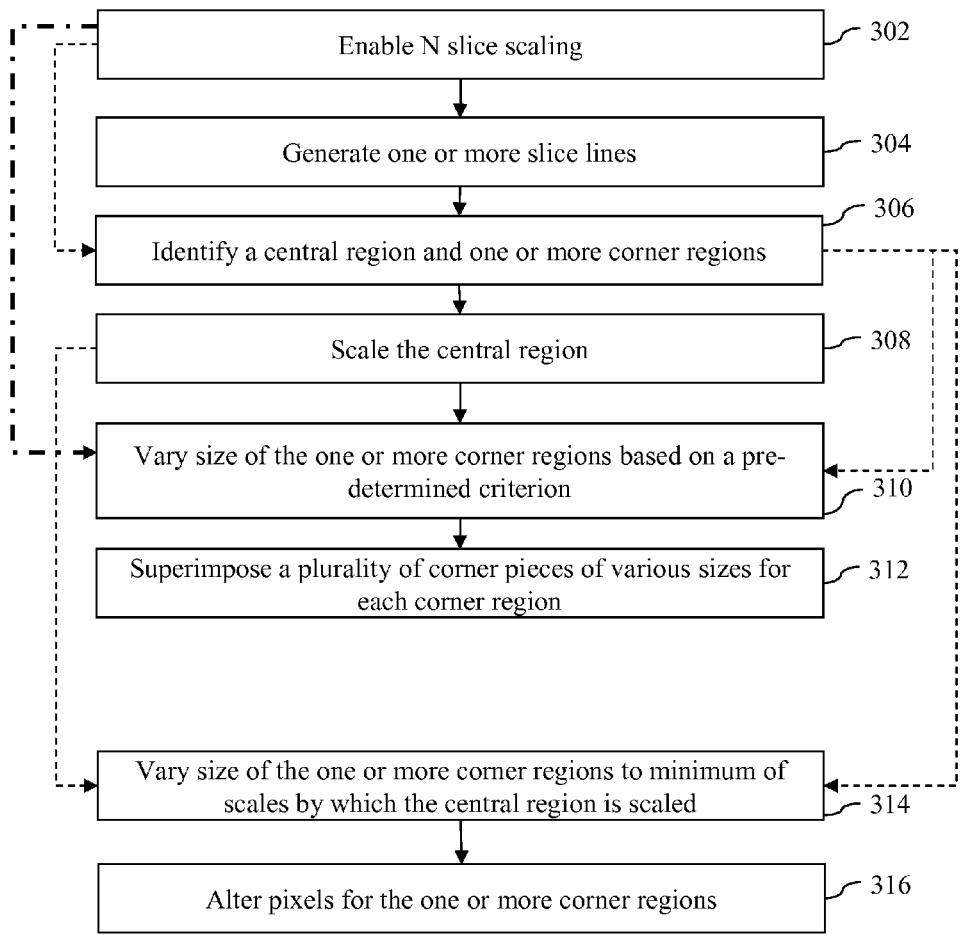
FIG. 3 is a flowchart illustrating a method for N slice scaling of a figure in accordance with an embodiment of the invention.
Figures 4D, 4E, 4F:
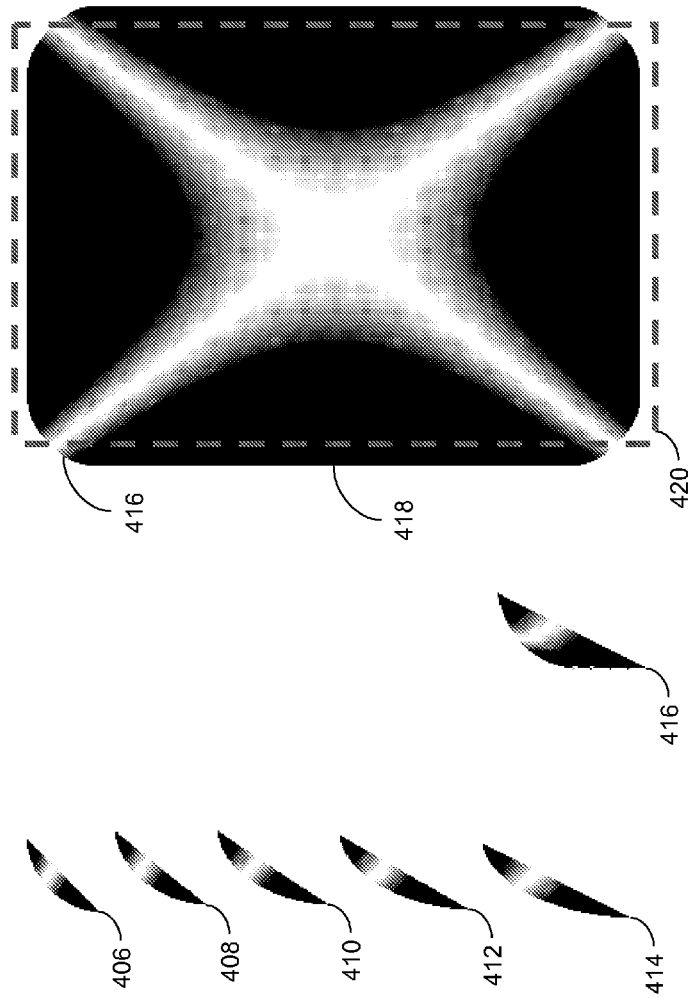

FIG. 3 is a flowchart illustrating a method for N slice scaling of a figure, for example, a bitmap figure, in accordance with an embodiment of the invention. At step 302, the N slice scaling of the figure is enabled, for example, by checking a check box.

Thereafter, at step 304, one or more slice lines are generated. An input is received for one slice line. In an embodiment of the invention, when the figure has a regular shape a user draws any one slice line which is considered as the input. In another embodiment of the invention, the user may mark two slice points on the figure and the two slice points may then be joined to give the one slice line which is considered as the input.

Other slice lines for the figure are then generated and arranged symmetrically in response to the input. For example, in case of a rounded rectangle, if one slice line is drawn at 45 degrees then other slice lines may be arranged at −45, 135 and −135 degrees. In an embodiment of the invention, the other slice lines may be symmetrically arranged by taking mirror image about the center. In another embodiment of the invention, symmetry generation for N slices may be generalized as (360/N)*I where I represents a slice number.

In an embodiment of the invention, step 304 is bypassed and the user draws one or more slice lines. In another embodiment of the invention, the user may mark multiple slice points which may then be joined using straight lines to generate the one or more slice lines.

The one or more slice lines divide the figure into a plurality of regions. In an embodiment of the invention, the plurality of regions include a central region and one or more corner regions.

It will be appreciated that the user may also draw one or more curves instead of the one or more slice lines to optimize areas of the one or more corner regions. In an embodiment of the invention, optimizing the areas of the one or more corner regions includes minimizing the areas of the one or more corner regions.

In an embodiment of the invention, at step 306, the central region is identified by using the center of the figure. In another embodiment of the invention, a bigger region may be identified as the central region and smaller regions as the one or more corner regions.

It will be appreciated that any other known technique for identifying the central region may also be used.

Thereafter, at step 308, the central region is scaled. In an embodiment of the invention, a scaling input including scale x and scale y is received. The central region may then be scaled by a scale including scale x and scale y.

In an embodiment of the invention, step 308 is bypassed and the user scales the central region as desired.

In an embodiment of the invention, step 304 to step 308 are bypassed and the one or more corner regions are received or provided for scaling.

At step 310, size of the one or more corner regions is varied based on a predetermined criterion. In an embodiment of the invention, the predetermined criterion includes scaling the one or more corner regions to a minimum of scale x and scale y by which the central region is scaled and then scaling the one or more corner regions in a particular direction to a maximum of scale x and scale y to give a plurality of corner pieces of various sizes. For example, if a central region is scaled by (2, 4) times then the predetermined criterion includes scaling the one or more corner regions to (2, 2) and then scaling the one or more corner regions in the y direction to maximum of (2, 4) to give corner pieces of sizes (2, 2.5), (2, 3), (2, 3.5) and (2, 4) for each corner region.

In another embodiment of the invention, the predetermined criterion may include scaling the one or more corner regions to a minimum of a predefined scale. The predefined scale may be defined by the user and may include scale x and scale y.

In an embodiment of the invention, a generalized pseudocode for the predetermined criterion includes the following.

Smin=minimum (scale x, scale y) where scale x and scale y may be fractions (scale x<scale y)
Sfrac=(scale y−scale x)/m, where m is user defined
Scale each of the n slices m+1 times
S0=(Smin, Smin)
S1=(Smin, Smin+Sfrac)
Any Sr=(Smin, Smin+r*Sfrac)
Vice versa for (scale x>scale y)

Smin is determined as the minimum of scale x and scale y. Assuming scale x is less than scale y, Sfrac is calculated using a user defined variable m. In an embodiment of the invention, m is either 4 or 5. Each corner region is then scaled m+1 times to give the plurality of corner pieces of various sizes for each corner region.

At step 312, the plurality of corner pieces of various sizes are then superimposed for each corner region. In an embodiment of the invention, for each corner region, corner pieces scaled by the minimum of scale x and scale y are placed at the bottom and the rest of the corner pieces are placed one by one above them, and flattened into one layer. The layers are then placed over the central region and flattened to get the N slice scaled figure.

In an embodiment of the invention, step 310 and step 312 are bypassed and at step 314, the size of the one or more corner regions is varied to the minimum of scale x and scale y by which the central region is scaled. In another embodiment of the invention, the size of the one or more corner regions may be varied to the minimum of the predefined scale. The predefined scale may be defined by the user and may include scale x and scale y.

In one direction there is less number of pixels as the central region is scaled to a greater value in that direction.

At step 316, the pixels are altered to fill the gap created due to the less number of pixels in that direction. In an embodiment of the invention, new pixels color values are calculated by using various extrapolation techniques, for example, linear extrapolation technique.

For example, if the central region is scaled (2, 4) times then the one or more corner regions are scaled (2, 2) times. The gap is created between each corner region scaled (2, 2) times and the central region scaled (2, 4) times. Pixel color values for Red color or any other color for each corner region scaled (2, 2) times may then be 50, 70, 80, 100. In an embodiment of the invention, the number of pixels required for filling the gap is calculated by dividing one scale of the central region by the other scale of the central region, and then multiplying the division result by the number of pixel color values in the corner region scaled by the minimum of scale x and scale y. In the illustrated example, the number of pixels required is eight [(scale y=4/scale x=2)*(Number of pixel color values=4)]. The eight new pixel color values may then be calculated using linear extrapolation technique as 50, 58, 66, 72, 78, 84, 92, and 100.

The N slice scaling scales the one or more corner regions while maintaining aspect ratio of the one or more corner regions. The aspect ratio is width to height ratio.

The scaling while maintaining the aspect ratio is explained in conjunction with N slicing above. It will be appreciated that the scaling could be used in any interpolation or extrapolation process or nine slice scaling or three slice scaling.

In an embodiment of the invention, one or more steps of the method described in FIG. 3 may be implemented using a machine-readable medium product. Examples of the machine-readable medium product include but are not limited to memory devices, tapes, disks, cassettes, integrated circuits, servers, magnetic media, optical media, online software, download links, installation links, and online links.

The method for N slice scaling of the figure is explained with help of an example in FIGS. 4a, 4b, 4c, 4d, 4e and 4f.

FIGS. 4a, 4b, 4c, 4d, 4e and 4f are exemplary representations of N slice scaling of a rectangle 402 with rounded corners in accordance with an embodiment of the invention. In the exemplary representations, rectangle 402 has a dimension of (scale x=150, scale y=100) and is a bitmap rectangle.

In an embodiment of the invention, one or more slice lines are generated at 45 degrees, 135 degrees, −45 degrees and −135 degrees. The one or more slice lines divides rectangle 402 into a plurality of regions including a central region and one or more corner regions. The central region is scaled 2 times in the x direction and 4 times in the y direction to give central region 404.

The one or more corner regions are scaled to a minimum of scale x and scale y by which the central region is scaled. In the illustrated example, scale x=2 is the minimum.

Further steps are explained below with help of one corner region. It will be appreciated that these steps may be applied to the one or more corner regions simultaneously or one after other.

The corner region is scaled 2 times in the x direction and 2 times in the y direction to give corner piece 406. Similarly, corner piece 408, corner piece 410, corner piece 412, corner piece 414 are obtained by scaling the corner region (2, 2.5), (2, 3), (2, 3.5) and (2, 4) times. Corner piece 406 is placed at bottom and rest corner piece 408, corner piece 410, corner piece 412, corner piece 414 are placed over corner piece 406 one by one to form a set. The set has different layers which are then flattened to give scaled corner region layer 416. Flattening results in generating a single layer.

Similarly, other scaled corner region layers are also obtained. Scaled corner region layer 416 and other scaled corner region layers are then placed over central region 404 and flattened to give N slice scaled rectangle 418. Further, graphic 420 (shape "X") also has pleasant effect.

Figure 5:
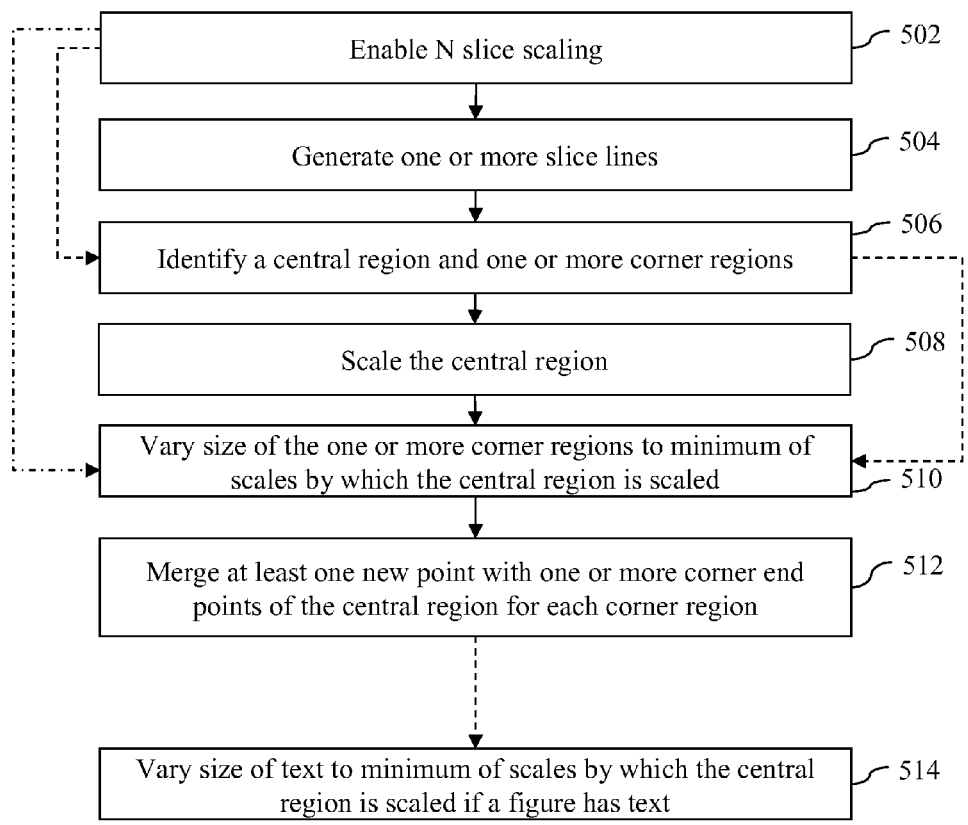
FIG. 5 is a flowchart illustrating a method for N slice scaling of a figure in accordance with an embodiment of the invention.

FIG. 5 is a flowchart illustrating a method for N slice scaling of a figure, for example, a vector figure in accordance with an embodiment of the invention. At step 502, the N slice scaling of the figure is enabled, for example, by checking a check box.

Thereafter, at step 504, one or more slice lines are generated. In an embodiment of the invention, the one or more slice lines are generated automatically. One or more control points of the figure are already known and are identified as slice points. Two consecutive slice points are joined using straight lines to generate the one or more slice lines. Lines which coincide with the figure are eliminated.

In another embodiment of the invention, the number of slice points may be varied. For example, one slice point may be added between two consecutive slice points which may then be used for generating the one or more slice lines.

In yet another embodiment of the invention, a user draws a curve using a vector tool to identify the slice points. The curve drawn is an input which generates additional one or more control points. The additional one or more control points are then optimized to identify the slice points. For example, in case of a rectangle with rounded corners a curve may be drawn concentric with a rounded corner and intersecting the rounded corner at two points. The curve may generate m control points. If a line joining control point i and control point i+1 has same or close angle to line joining control point i+1 and control point i+2 then control point i and control point i+2 will be included in the slice points. Two consecutive slice points are then joined using straight lines to generate the one or more slice lines. Lines which coincide with the figure are eliminated.

In still another embodiment of the invention, the user draws the curve using the vector tool. The curve drawn intersects with the figure and intersection points are identified as the slice points. Two consecutive slice points are then joined using straight lines to generate the one or more slice lines. Lines which coincide with the figure are eliminated.

In an embodiment of the invention, step 504 is bypassed and the user draws one or more slice lines. In another embodiment of the invention, the user may mark multiple slice points which may then be joined using straight lines to generate the one or more slice lines.

The one or more slice lines divide the figure into a plurality of regions. In an embodiment of the invention, the plurality of regions include a central region and one or more corner regions.

It will be appreciated that areas of the one or more corner regions may be optimized by varying the number of slice points. In an embodiment of the invention, optimizing the areas of the one or more corner regions includes minimizing the areas of the one or more corner regions.

In an embodiment of the invention, at step 506, the central region is identified by using the center of the figure. In another embodiment of the invention, a bigger region may be identified as the central region and smaller regions as the one or more corner regions.

It will be appreciated that any other known technique for identifying the central region may also be used.

In an embodiment of the invention, each slice line results in two corner end points per corner for the central region. Each slice line also results in two points for each corner region. For example, the central region in case of a rounded rectangle may have two corner end points corresponding to each corner region and a total of eight corner end points corresponding to four corners of the central region. Each corner region also has two points.

Thereafter, at step 508, the central region is scaled. In an embodiment of the invention, a scaling input including scale x and scale y is received. The central region may then be scaled by a scale including scale x and scale y.

In an embodiment of the invention, step 508 is bypassed and the user scales the central region as desired.

In an embodiment of the invention, step 504 to step 508 are bypassed and the one or more corner regions are received or provided for scaling.

At step 510, size of the one or more corner regions is varied. In an embodiment of the invention, the one or more corner regions are scaled to a minimum of scale x and scale y by which the central region is scaled. In another embodiment of the invention, the one or more corner regions may be scaled to a minimum of a predefined scale. The predefined scale may be defined by the user and may include scale x and scale y. Varying the sizes of the one or more corner regions results in generation of at least one new point for each corner region.

At step 512, at least one new point is merged with one or more corner end points of the central region for each corner region. In an embodiment of the invention, each slice line results in two corner end points per corner for the central region and the varying results in two new points for each corner region. Out of the two new points one new point coincides with a corresponding corner end point of the central region. Such coinciding points are merged.

In an embodiment of the invention, for each corner region, the other new point of the corner region is moved to corresponding corner end point of the central region or vice versa. After moving, the points are merged. In another embodiment of the invention, for each corner region, the other new point of the corner region and corresponding corner end point of the central region are moved towards each other and merged. In yet another embodiment of the invention, one or more new points of the one or more corner regions are moved towards each other and merged if the one or more corner regions result from one or more slice lines intersecting each other on the figure.

The N slice scaling scales the one or more corner regions while maintaining aspect ratio of the one or more corner regions. The aspect ratio is width to height ratio.

In an embodiment of the invention, at step 514, if the figure includes text then the size of the text is varied to minimum of scale x and scale y by which the central region is scaled.

The scaling while maintaining the aspect ratio is explained in conjunction with N slicing above. It will be appreciated that the scaling could be used in any interpolation or extrapolation process or nine slice scaling or three slice scaling.

In an embodiment of the invention, one or more steps of the method described in FIG. 5 may be implemented using a machine-readable medium product. Examples of the machine-readable medium product include but are not limited to memory devices, tapes, disks, cassettes, integrated circuits, servers, magnetic media, optical media, online software, download links, installation links, and online links.

The method for N slice scaling of the figure is explained with help of an example in FIGS. 6a, 6b, 6c and 6d.

FIGS. 6a, 6b, 6c and 6d are exemplary representations of N slice scaling of a rectangle 602 with rounded corners in accordance with an embodiment of the invention. A normally scaled rectangle 620 (inner black portion with graphic in FIG. 6c) is also included to show how an N slice scaled rectangle 632 with a graphic 630 (shape "X") has a more pleasant effect. In the exemplary representations, rectangle 602 has a dimension (scale x=150, scale y=100) and is a vector rectangle.

In an embodiment of the invention, one or more control points (shown in white color in FIG. 6a) of rectangle 602 are known. The one or more control points are identified as slice points, for example, slice points 606a, 606b and 606c. Slice lines 604a, 604b, 604c and 604d are automatically generated by joining two consecutive slice points of rectangle 602. For example, a slice line 604a is generated using slice points 606a and 606b. Line 608 obtained using slice points 606b and 606c is eliminated as it coincides with rectangle 602.

Slice lines 604a, 604b, 604c and 604d divide rectangle 602 into plurality of regions. The plurality of regions include a central region and one or more corner regions, for example, a corner region 610. Each corner region has two points and the central region has eight corner end points when rectangle 602 is divided by slice lines 604a, 604b, 604c and 604d.

In an embodiment of the invention, an additional slice point may be added to minimize areas of the one or more corner regions. For example, a slice point 616 (shown in white color in enlarged version of corner region 610 in FIG. 6b) may be added to minimize area of corner region 610. Two slice lines 604e and 604f divide corner region 610 into two corner regions 612 and 614. Corner regions 612 and 614 may then be scaled using the method of FIG. 5.

It will be appreciated that a user may be provided an option to select to what extent the areas of corner region 610 or any other corner region of rectangle 602 needs to be minimized. For example, the user may specify the number of additional slice points to be generated.

Figure 6B:
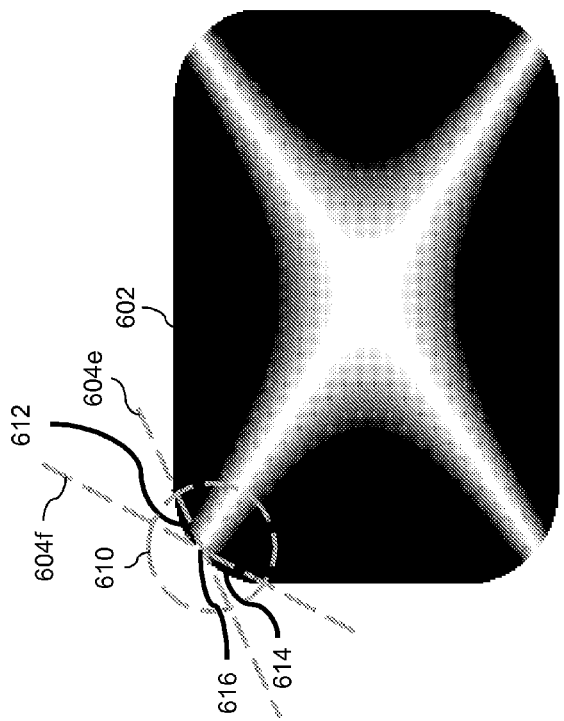
FIGS. 6a, 6b, 6c and 6d are exemplary representations of N slice scaling of a rectangle with rounded corners in accordance with an embodiment of the invention.
Figure 6A:
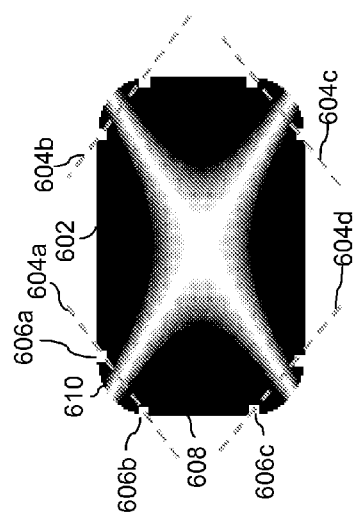
Figure 6D:
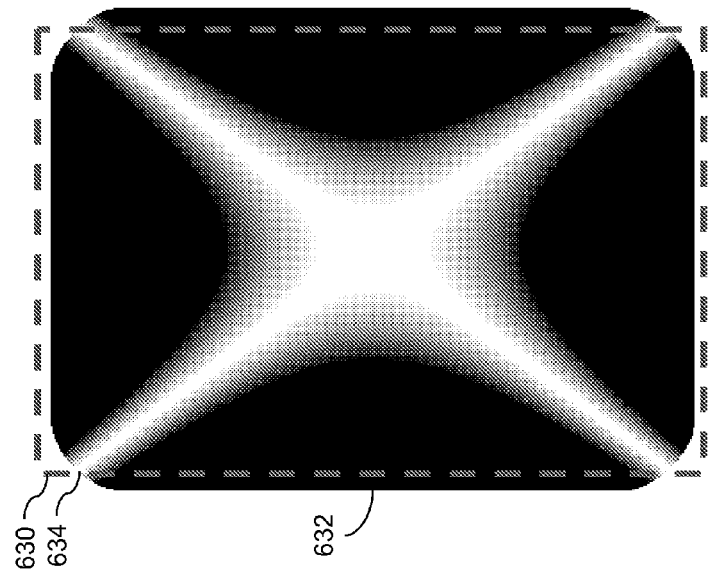

Further steps are explained below with help of corner region 610 of FIG. 6a. It will be appreciated that these steps are applied to the one or more corner regions simultaneously or one after other.

Figure 6C:
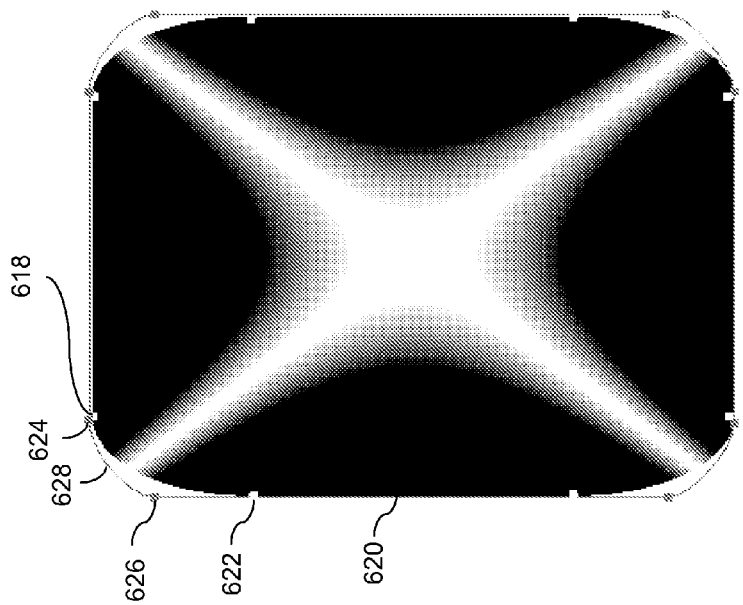

The central region is scaled 2 times in the x direction and 4 times in the y direction (shown in FIG. 6c). Corner region 610 is scaled 2 times in the x direction and 2 times in the y direction which is minimum of scale x=2 and scale y=4 by which the central region is scaled to give corner region 628 (between 624 and 626 in FIG. 6c). Corner region 628 has two new points, for example, a new point 626 and a new point 624. New point 624 and a corner end point 618 (in white color, not seen clearly as it is hidden behind new point 624) of the central region coincide with each other and our merged.

In an embodiment of the invention, corner end point 622 (shown in white color) of the central region is moved to new vector point 626 and merged to get scaled corner 634.

In another embodiment of the invention, new vector point 626 is moved to corner end point 622 (shown in white color) of the central region to get scaled corner 634.

In yet another embodiment of the invention, new vector point 626 and corner end point 622 (shown in white color) of the central region are moved towards each other and merged to get scaled corner 634.

Similarly, other corners are scaled to obtain N slice scaled rectangle 632.

Figure 7:
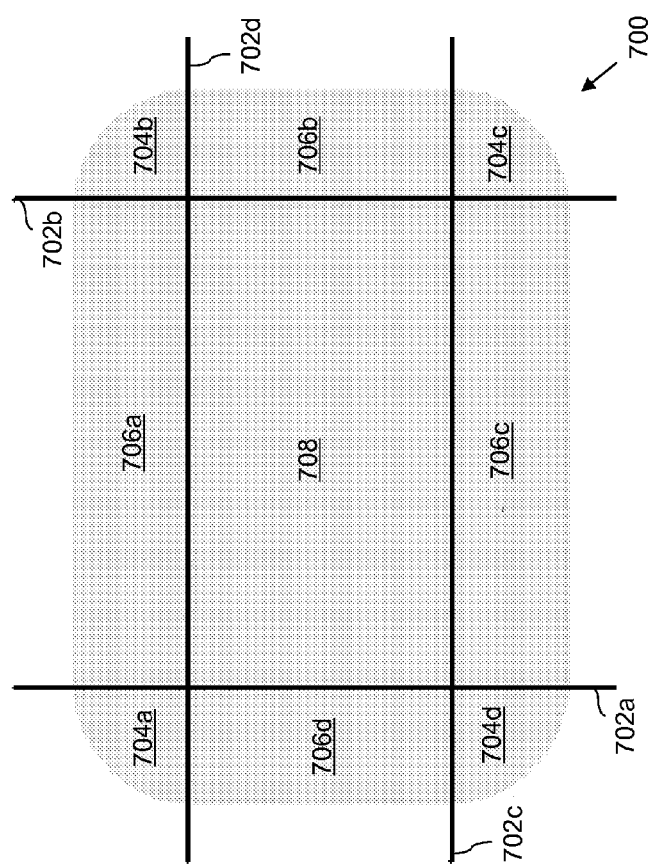
FIG. 7 is an exemplary representation illustrating application of scaling in nine slice scaling of a figure in accordance with an embodiment of the invention.

FIG. 7 is an exemplary representation illustrating application of scaling in nine slice scaling of a figure, for example, a rectangle 702 in accordance with an embodiment of the invention. Rectangle 702 is divided into plurality of regions by two vertical slice lines 702a and 702b, and two horizontal slice lines 702c and 702d. The plurality of regions include one or more corner regions including corner regions 704a, 704b, 704c and 704d, a central region 708 and one or more side regions including side regions 706a, 706b, 706c and 706d.

In an embodiment of the invention, central region 708 is scaled by scale x and scale y by which central region 708 is scaled. Side regions 706a, 706b, 706c and 706d are also scaled by scale x and scale y. Corner regions 704a, 704b, 704c and 704d are scaled using, for example, any method described in FIG. 3 or FIG. 5.

Figure 8B:
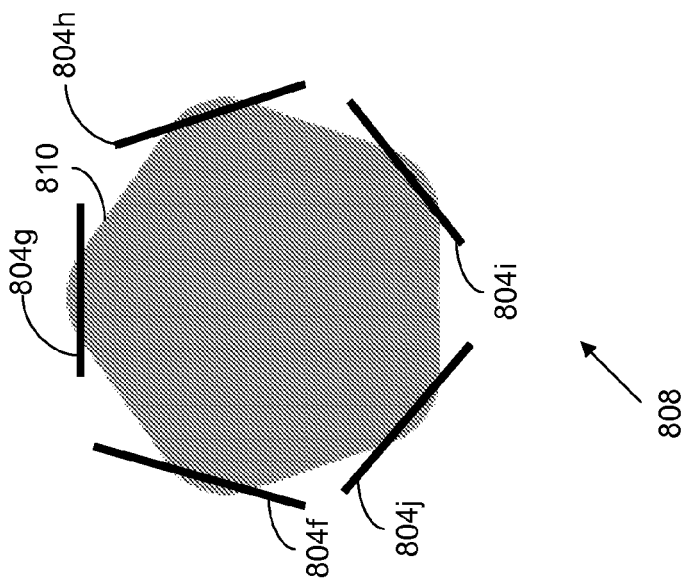
FIGS. 8a and 8b are exemplary representations of one or more slice lines for a star and a pentagon in accordance with an embodiment of the invention.
Figure 8A:
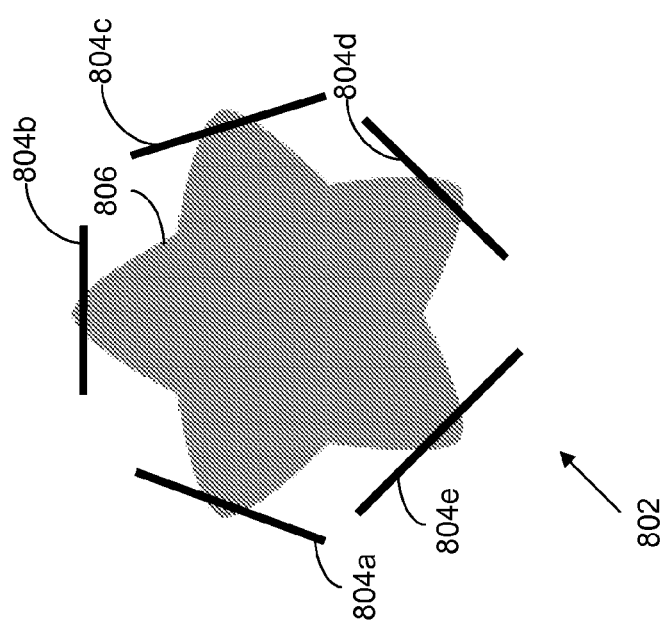

FIGS. 8a and 8b are exemplary representations of one or more slice lines for a star 802 and a pentagon 808 in accordance with an embodiment of the invention.

Star 802 has rounded corners. In an embodiment of the invention, star 802 is a bitmap figure for which a user draws any one slice line, for example, slice line 804a and other slice lines 804b, 804c, 804d and 804e are automatically generated and arranged symmetrically with respect to the center of star 802.

In another embodiment of the invention, star 802 is a vector figure for which slice lines 804a, 804b, 804c, 804d and 804e are automatically generated using control points of star 802.

It will be appreciated that the one or more slice lines may be generated using, for example, any method described in FIG. 3 or FIG. 5.

Slice lines 804a, 804b, 804c, 804d and 804e divide star 802 into plurality of regions including one or more corner regions and a central region 806. Central region 806 and the one or more corner regions are then scaled. The one or more corner regions are scaled using, for example, any method described in FIG. 3 or FIG. 5.

Pentagon 808 has rounded corners. In an embodiment of the invention, pentagon 808 is a bitmap figure for which a user draws any one slice line, for example, slice line 804f and other slice lines 804g, 804h, 804i and 804j are automatically generated and arranged symmetrically with respect to the center of pentagon 808.

In another embodiment of the invention, pentagon 808 is a vector figure for which slice lines 804f, 804g, 804h, 804i and 804j are automatically generated using control points of pentagon 808.

It will be appreciated that the one or more slice lines may be generated using, for example, any method described in FIG. 3 or FIG. 5.

Slice lines 804f, 804g, 804h, 804i and 804j divide pentagon 808 into plurality of regions including one or more corner regions and a central region 810. Central region 806 and the one or more corner regions are then scaled. The one or more corner regions are scaled using, for example, any method described in FIG. 3 or FIG. 5.

Figure 9:
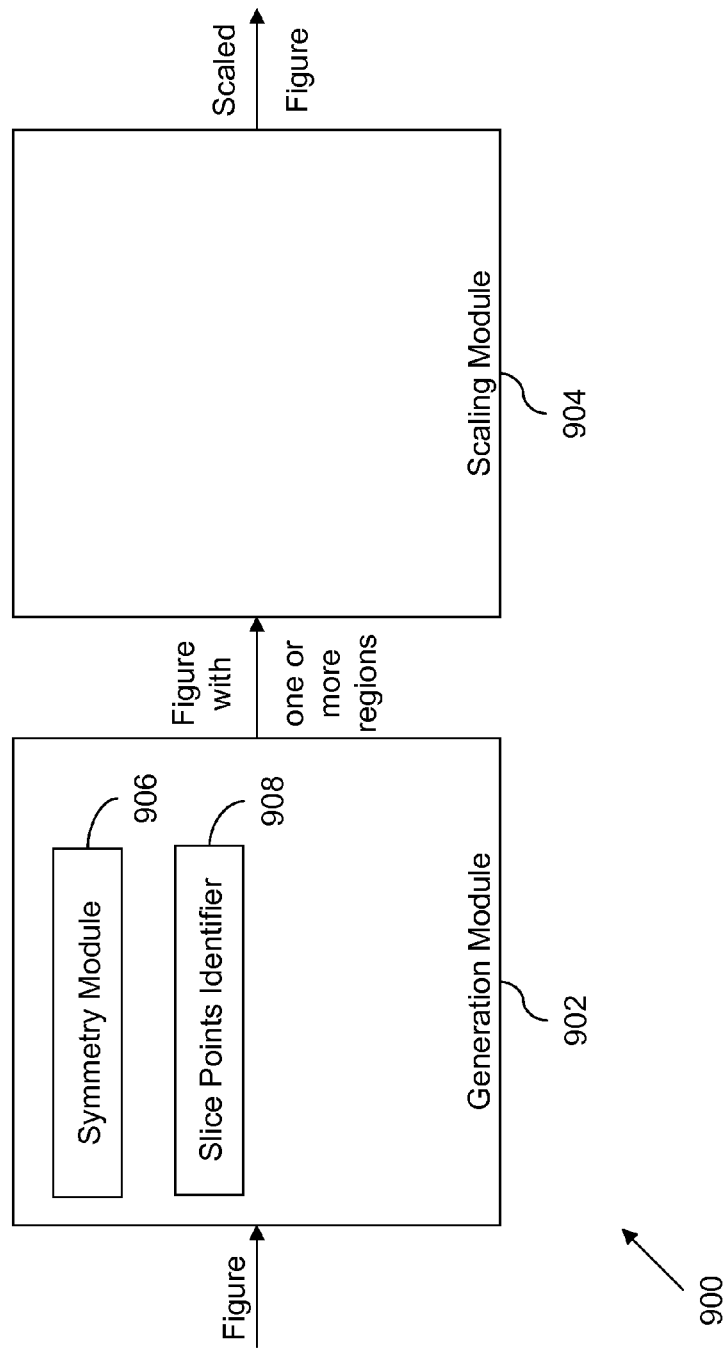
FIG. 9 is a block diagram of a system in accordance with an embodiment of the invention.

FIG. 9 is a block diagram of a system 900 in accordance with an embodiment of the invention. System 900 includes one or more modules including a generation module 902 and a scaling module 904.

Generation module 902 generates one or more slice lines for a figure. In an embodiment of the invention, generation module 902 includes a symmetry module 906 for arranging symmetrically other slice lines in response to an input for one slice line.

In some embodiments of the invention, generation module 902 also includes a slice points identifier 908 for identifying slice points used for generating the one or more slice lines. The one or more slice lines divide the figure into plurality of regions. The plurality of regions include a central region and one or more corner regions.

In an embodiment of the invention, generation module 902 may also include an identification module for identifying the central region and the one or more corner regions.

Scaling module 904 receives the figure divided into plurality of regions by the one or more slice lines. Scaling module 904 scales the one or more corner regions while maintaining aspect ratio. The aspect ratio is width to height ratio.

Scaling module 904 is explained in conjunction with generation module 902 above. It will be appreciated that scaling module 904 could be used for any interpolation or extrapolation process or nine slice scaling or three slice scaling.

The N slice scaling scales the one or more corner regions while maintaining their aspect ratio. The aspect ratio is width to height ratio. For example, the one or more corner regions of a rectangle having dimension (scale x=150, scale y=100) has aspect ratio 1:1. If the central region of the rectangle is scaled 2 times in the x direction and 4 times in the y direction then the one or more corner regions are scaled 2 times in the x direction and 2 times in the y direction followed by 2 times further scaling in the y direction. This maintains the aspect ratio of the one or more corner regions as 1:1. The N slice scaling or the multiple slice scaling has a pleasant effect as the scaling is performed while maintaining the aspect ratio. Further, the N slice scaling is applicable to regular or irregular bitmaps and vectors. Moreover, the areas of the one or more corner regions are minimized to minimize unpleasant effects of uneven scaling, if any.

While embodiments of the invention are disclosed in terms of exemplary embodiments, it can be practiced in a number of ways as defined by the scope of the appended claims. Additionally, various features of embodiments of the invention can be modified in a myriad of ways to achieve the goal of scaling figures.

I claim:

1. A method, comprising:
   generating one or more slice lines for a figure,
      wherein the one or more slice lines result in a plurality of regions comprising a central region and one or more corner regions, and
      wherein at least one of the one or more slice lines is at a non-horizontal and non-vertical angle; and
   scaling the figure, wherein said scaling comprises:
      scaling the central region; and
      scaling the one or more corner regions differently from said scaling the central region.

2. The method of claim 1, wherein the generating comprises:
   arranging symmetrically at least one slice line with respect to center of the figure.

3. The method of claim 1, wherein the generating comprises:
   identifying slice points for the figure.

4. The method of claim 3, wherein the generating further comprises:
   joining two consecutive slice points of the figure through a line; and
   eliminating lines coinciding with the figure.

5. The method of claim 1, wherein the generating comprises:
   optimizing areas of the one or more corner regions.

6. The method of claim 1,
   wherein the scaling the one or more corner regions comprises:
      generating a plurality of scaling results for each corner of the one or more corners,
         wherein each of the plurality of scaling results is based on a predetermined criterion; and
      generating a single corner piece from superimposing the plurality of scaling results for each corresponding corner of the one or more corners; and
   wherein said scaling the figure further comprises:
      generating a scaled figure comprising the scaled central region and each corner piece generated from superimposing the plurality of scaling results for the corresponding corner of the one or more corners.

7. The method of claim 1, wherein the scaling the one or more corner regions comprises:
   determining a vertical amount and a horizontal amount of said scaling the central region; and
   scaling each of the one or more corner regions in both a horizontal and vertical direction by a same amount,
      wherein the same amount is equal to a minimum of the vertical amount and the horizontal amount of said scaling the central region.

8. The method of claim 7, wherein the scaling the one or more corner regions further comprises:
   identifying at least one new point for each corner region;
   identifying one or more corner end points of the central region for each corner region; and
   merging the at least one new point with one or more corner end points of the central region for each corner region.

9. The method of claim 1 further comprising:
   varying size of text of the figure to a minimum of a scale by which the central region is scaled.

10. A method, comprising:
    receiving one or more corner regions of a figure,
       wherein the one or more corner regions are defined by one or more slice lines, and
       wherein at least one of the one or more slice lines is at a non-horizontal and non-vertical angle; and
    scaling the one or more corner regions while maintaining an aspect ratio of the one or more corner regions.

11. A non-transitory machine-readable medium product comprising instructions operable to cause a programmable processor to perform:
    generating one or more slice lines for a figure,
       wherein the one or more slice lines result in a plurality of regions comprising a central region and one or more corner regions, and
       wherein at least one of the one or more slice lines is at a non-horizontal and non-vertical angle; and
    scaling the figure, wherein said scaling comprises:
       scaling the central region; and
       scaling the one or more corner regions differently from said scaling the central region.

12. The non-transitory machine-readable medium product of claim 11, wherein the generating comprises:
    arranging symmetrically at least one slice line with respect to center of the figure.

13. The non-transitory machine-readable medium product of claim 11, wherein the generating comprises:
    identifying slice points for the figure.

14. The non-transitory machine-readable medium product of claim 13, wherein the generating further comprises:
    joining two consecutive slice points of the figure through a line; and
    eliminating lines coinciding with the figure.

15. The non-transitory machine-readable medium product of claim 11, wherein the generating comprises:
    optimizing areas of the one or more corner regions.

16. The non-transitory machine-readable medium product of claim 11,
    wherein the scaling the one or more corner regions comprises:
       generating a plurality of scaling results for each corner of the one or more corners,
          wherein each of the plurality of scaling results is based on a predetermined criterion; and
       generating a single corner piece from superimposing the plurality of scaling results for each corresponding corner of the one or more corners; and
    wherein said scaling the figure further comprises:
       generating a scaled figure comprising the scaled central region and each corner piece generated from superimposing the plurality of scaling results for the corresponding corner of the one or more corners.

17. The non-transitory machine-readable medium product of claim 11, wherein the scaling the one or more corner regions comprises:
    determining a vertical amount and a horizontal amount of said scaling the central region; and
    scaling each of the one or more corner regions in both a horizontal and vertical direction by a same amount,
       wherein the same amount is equal to a minimum of the vertical amount and the horizontal amount of said scaling the central region.

18. The non-transitory machine-readable medium product of claim 17, wherein the scaling the one or more corner regions comprises:
    identifying at least one new point for each corner region;
    identifying one or more corner end points of the central region for each corner region; and
    merging the at least one new point with one or more corner end points of the central region for each corner region.

19. The non-transitory machine-readable medium product of claim 11 further comprising:

instructions operable to cause a programmable processor to perform varying size of text of the figure to a minimum of a scale by which the central region is scaled.

20. A system, comprising:
a processor configured to implement:
  a generation module for generating one or more slice lines for a figure,
    wherein the one or more slice lines result in a plurality of regions comprising a central region and one or more corner regions, and
    wherein at least one of the one or more slice lines is at a non-horizontal and non-vertical angle; and
  a scaling module for scaling the figure, wherein said scaling comprises:
    scaling the central region, and
    scaling the one or more corner regions differently from said scaling the central region.

21. The system of claim 20, wherein the generating module comprises:
a symmetry module for arranging at least one slice line symmetrically with respect to center of the figure.

22. The system of claim 20, wherein the generating module comprises:
a slice points identifier for identifying slice points for the figure.

* * * * *